TIMING ARRANGEMENT FOR DOCUMENT PROCESSOR

Filed July 20, 1965 3 Sheets-Sheet 1

INVENTOR.
NICHOLAS A. DEL VECCHIO
BY John V. Regan
Attorney

INVENTOR.
NICHOLAS A. DEL VECCHIO
BY John V. Regan
Attorney

INVENTOR.
NICHOLAS A. DEL VECCHIO
BY John V. Regan
Attorney

United States Patent Office 3,480,762
Patented Nov. 25, 1969

3,480,762

TIMING ARRANGEMENT FOR DOCUMENT PROCESSOR

Nicholas A. Del Vecchio, Lake Worth, Fla., assignor to RCA Corporation, a corporation of Delaware Filed July 20, 1965, Ser. No. 473,327
Int. Cl. G06k *7/00;* G01n *21/30*
U.S. Cl. 235—61.11 12 Claims

ABSTRACT OF THE DISCLOSURE

A document processor, with an arrangement for generating timing control signals synchronized with the movement of a document through said processor. The timing control signal is compared with the data output of said processor to signal an error condition caused by a misregistered perforation on a document.

In an information handling system, information may be recorded on a document in the form of meaningful patterns of perforations, recorded spots, printed characters, etc. The document usually is one having a fixed plurality of equally spaced lines or rows of data recording positions. It is necessary to maintain synchronism between the operation of the recorder and the movement of the document therethrough in order that the information may be recorded at the proper data storage positions. Likewise, during a read operation, it is necessary to synchronize the operation of the equipment receiving the sensed information with the movement of the document through the reader.

It has been suggested that synchronizing signals be generated by a series of light responsive elements spaced along the direction of document travel. According to one proposed system, there is a one-to-one correspondence between the number of elements and the number of lines of data storage positions on the document. The elements are positioned so that the leading edge of the document passes between a light source and a light responsive element, to effect generation of a timing signal, as the respective line of data storage positions is presented to the work elements in the processor, e.g. reading elements or punches. A major disadvantage of the aforementioned system is the large number of amplifiers and/or other circuitry required for the light sensitive elements. A further disadvantage is the close spacing of the elements and the resulting difficulty of replacing an element.

It is one object of this invention to provide a synchronizing or timing arrangement in which the number of light sensitive elements and related circuitry is less than the number of lines of data storage positions on the document.

It is another object of this invention to provide an arrangement in which several timing signals are generated in response to an output from a light sensitive, position sensing element.

Briefly stated, apparatus embodying the invention employs a series of M light responsive elements, where M is less than the number of lines of data storage positions on a document and preferably is a submultiple thereof. All of the elements have their outputs coupled to a first gate which produces a timing signal when an element goes dark. The elements are spaced along the feed path so that the first and succeeding elements go dark in succession as the first line of data storage positions of a document and every $K^{th}$ line thereafter successively reach a fixed location along the feed path, e.g. the work elements of the processor. Timing signals for the intervening lines of data storage positions are generated by delay means coupled to the output of the first gate. A second gate may be coupled to receive the output of the first gate and the output of each delay means, whereby the second gate produces an output signal as each line of data storage positions on a document is presented to the processor.

In a reader arrangement, it is common practice to employ two sets of read elements and compare the outputs thereof as a check on the operation of the reader elements. However, such a check does not insure that the recorded data has been read correctly. For example, the data may be misregistered on the document, that is, recorded in positions other than the normal data storage positions. Also, the document may be skewed relative to the reading elements. In either event, it is possible that the recorded data may not be in proper position to be read when a timing or synchronizing signal is applied to the reader.

Accordingly, it is a further object of this invention to provide means for checking the reading accuracy of a document reader.

It is another object of this invention to provide means for signaling an error condition in a document reader when misregistration of recorded data or document skew exceeds a predetermined tolerance.

The objects immediately aforementioned are accomplished by performing a so-called "land area" check. In particular, means are provided for generating timing pulses synchronized with the movement of a document through the reader. A timing pulse is generated each time that a predetermined area between adjacent lines of data storage positions should be present at the reader. An error condition is signaled if any of the reading elements senses data during the presence of a timing pulse.

In the accompanying drawing, like reference characters denote like components: and FIGURE 1 is a block diagram of a generalized synchronizing and timing arrangement for use in a document processor;

The synchronizing and timing arrangement of this invention is independent of the type of document employed or the particular manner in which information is recorded on the document. For purposes of example, however, the invention will be described hereinafter with particular reference to its use in a system for handling punched record cards. One well-known type of record card has eighty columns and twelve rows of index point or data storage positions. Each data storage position is located at the intersection of a different row and column.

Record cards may be fed in a direction normal to the data columns, whereby information is punched or read a column at a time. Alternatively, the cards may be fed in a direction normal to the card rows, whereby the data is punched or read a row at a time. In the appended claims, the term "line" is used in a generic sense to include both the rows and columns, depending upon the direction in which the card is fed to the processor. Also, the phrase "work elements" is used in a generic sense to include reading elements, punches, etc. in the processor.

When the processor is a punch station having a series of punch elements disposed across the path of document travel for punching a line of information a time, it is necessary that means be provided for synchronizing the operation of the punch elements with the movement of the card through the punch station. If synchronism is lost, it is possible that the punches may operate to perforate the record card at locations other than the index point positions, and it may then be impossible to retrieve the punched information in a reading station. When the processing station is a reader having a series of reading elements disposed across the document feed path for sensing information a line at a time, it is desirable to synchronize the operation of the read station with the movement of the card therethrough in order that the outputs of the reading elements may be supplied to user equipment during predetermined time intervals in the operating cycle.

Figure 1:
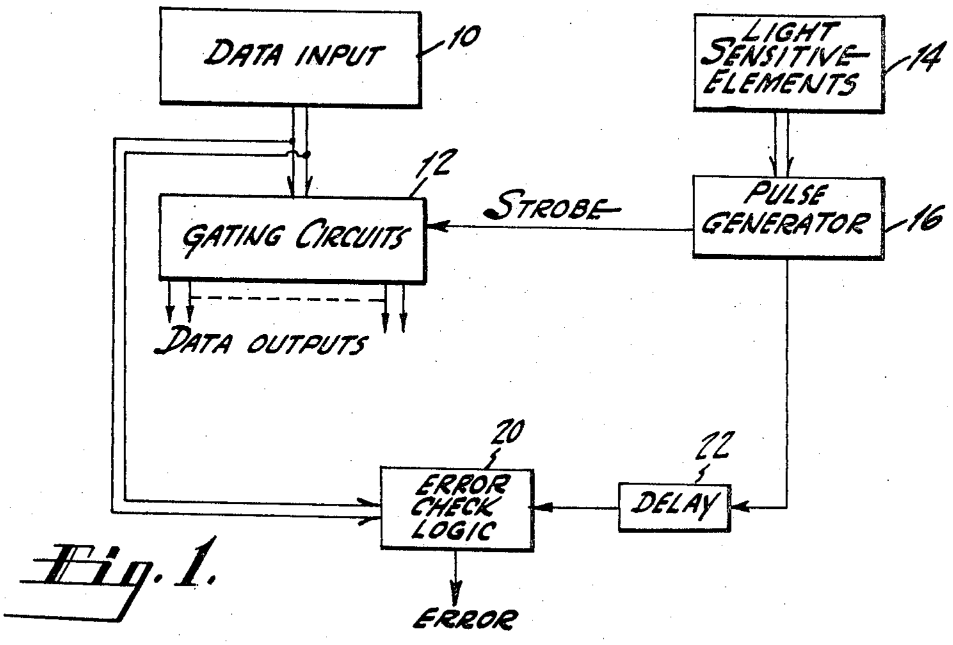

FIGURE 1 is a generalized block diagram of a timing system for accomplishing the aforementioned synchronization. When the processor is a reader, the data input source 10 may be the series of reading elements described hereinabove. The outputs of the individual reading elements are supplied as inputs to separate gates, represented by the box 12. The individual gates are strobed concurrently by strobe pulses synchronized with the movement of the card through the reading station. These strobe pulses may be derived from a set of light sensitive elements 14 which are disposed along the feed path at predetermined positions relative to the read station.

Each light sensitive element produces an output signal when the leading edge of the document covers the light sensitive element and cuts off the light therefrom. The outputs of all of the light sensitive elements may be supplied to a unit 16, labeled "pulse generator," which produces a strobe pulse for the gating circuits 12 in response to the receipt of a signal from any light sensitive element. In addition, and as will be described in detail hereinafter, the so-called pulse generator also may include means for generating a series of strobe or timing pulses in response to each input received from a light sensitive element.

If the data has been punched improperly on the card, in the sense that one or more of the perforations is misregistered with the corresponding index point or data storage position of the card, it is possible that such a perforation may not be detected by the reading element at the time the strobe pulse is applied to the gating circuits. In this event, there will be a loss of information since there will be no data output from the corresponding gating circuit. According to a further feature of the invention, such loss of information or improper perforation in a record card may be detected by supplying all of the outputs of the reading elements to an error check circuit 20. The output of the pulse generator 16 may be delayed in a device 22 and supplied as another input to the error check circuit 20. The delay device 22 delays the output of the pulse generator 16 the proper amount to supply a signal to the error check circuit 20 at a time when the interline spacing of the document, or a selected portion thereof, should be present at the reading station. No data should be sensed by the reading elements at this time if the card has been properly punched. The error check circuit 20 operates to produce an output signal indicating an error condition if any of the reading elements is sensing data during the presence of an output from the delay device 22.

The light sensitive elements 14 and pulse generator 16 also may be used in a card punch arrangement. In such an arrangement, the box 10 labeled "data input" is the input signal source for controlling the operation of the punches. The data outputs are supplied to the individual gating circuits 12, and the gating circuits are enabled by the strobe pulse supplied from the pulse generator 16. The light sensitive elements and pulse generator function to enable the gating circuits to actuate the selected punches when a line of data storage positions on a card is present at the punch station.

Figure 2:
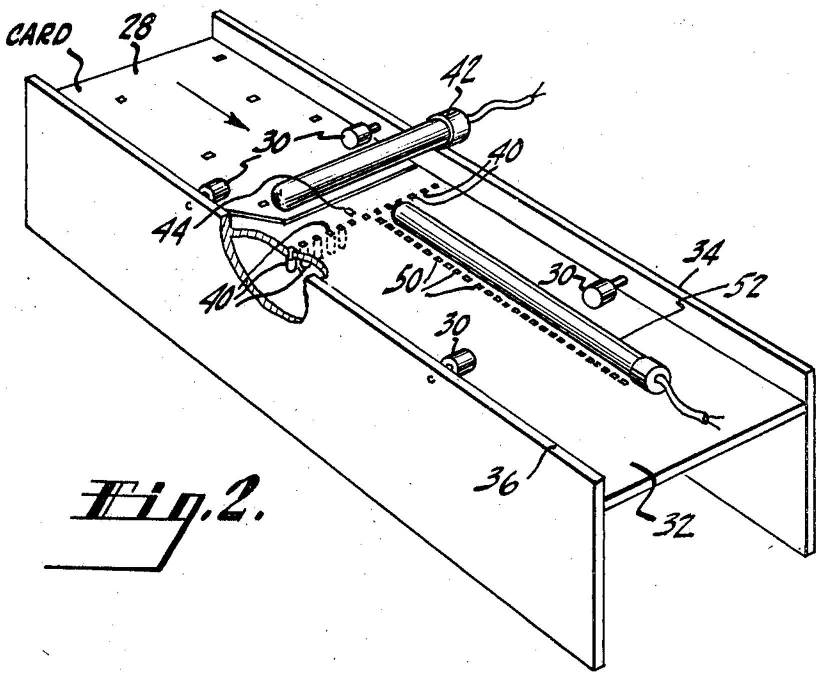
FIGURE 2 is a view in perspective of a document transport, processing station and series of light responsive elements for initiating timing pulses.
Figure 3:
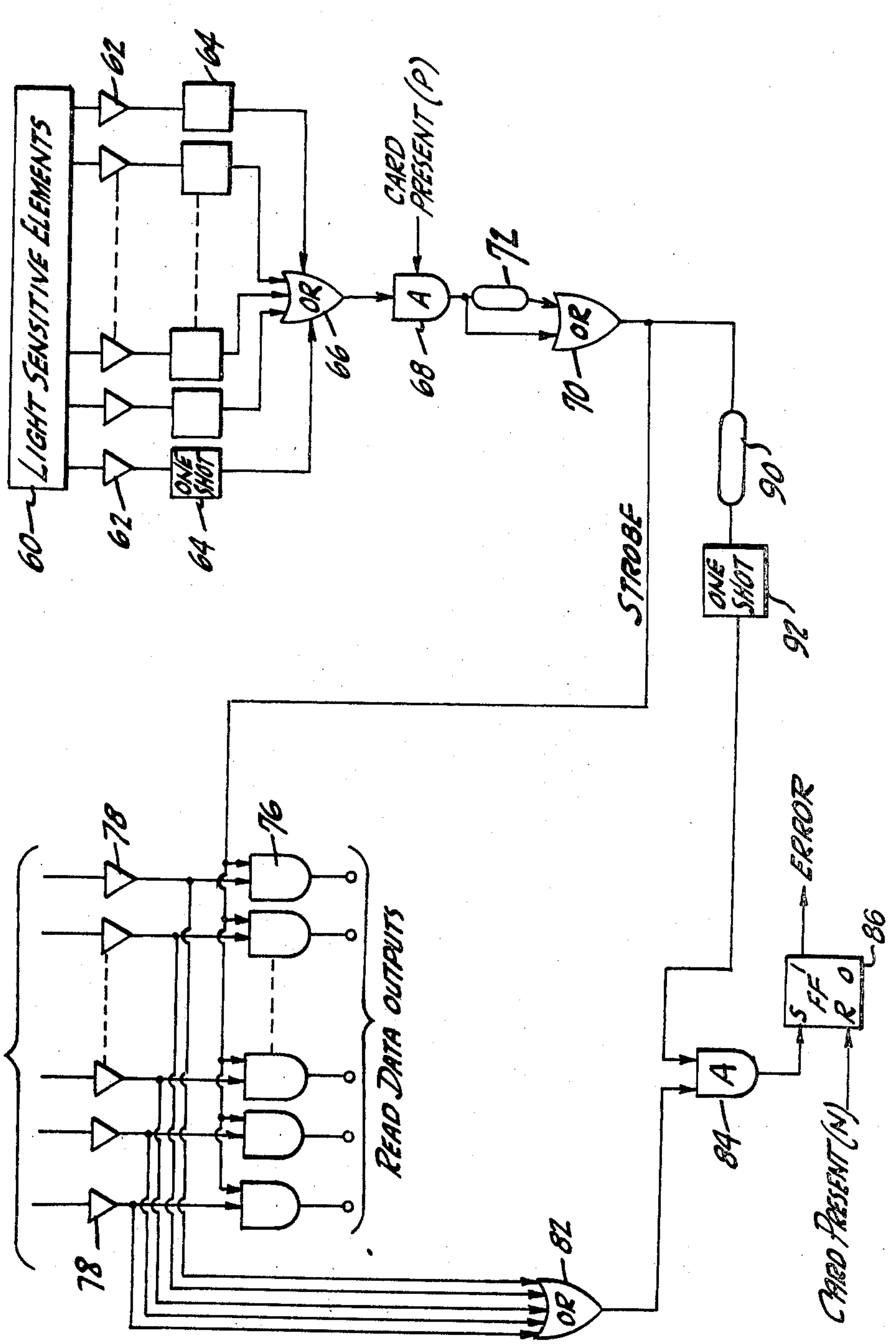
FIGURE 3 is a logic diagram of a synchronizing arrangement and error check arrangement for use with a document reader.

The manner in which the strobe pulses may be generated is illustrated in FIGURES 2 and 3. In FIGURE 2, perforated record cards 28 (or other documents) are fed along a guide path, by means of sets of rollers 30, in the direction indicated by the arrow. The processor may include a table 32 for supporting the record cards during transport, and the table 32 may have upwardly extending side members 34, 36 which serve as guides for the record cards. In the particular arrangement illustrated, the cards are shown as being fed in a direction normal to the card columns.

The processing station includes a series of light sensitive elements 40 disposed across the feed path at locations for sensing the perforations a column at a time. These light sensitive elements 40 may be located in areas cut out of the table 32. A light source 42, shown in phantom, is located above the table 32, whereby the document moves between the light source 42 and the reading elements 40. In addition, a light sensitive device 44 is located in the reading station and is used to detect the presence of a card at the reading station, for purposes which will become apparent hereinafter. Each of the reading elements 40 is in line with a different row of the record card 28. The additional sensing element 44 is located in line with an area of the card 28 between two adjacent rows, whereby element 44 receives no light when a card is present at the reading station.

The synchronizing pulses are derived from a series of light sensitive elements 50 which are spaced along the feed path on the output side of the read station. These latter light sensitive elements 50 are illustrated as being in alignment with an area of the record card located between two adjacent card rows. Thus, these light sensitive elements 50 do not detect any of the perforations of the record card. In the alternative, the light sensitive elements 50 could individually be located between different card rows for convenience in packing. A light source 52, shown in phantom, is located above the feed path, whereby the leading edge of the record card interrupts the light from a light sensitive element 50 as it covers that element.

In one prior art arrangement, one light sensitive element 50 is provided for each card column. That is to say, when the record card has eighty columns, there are eighty light sensitive elements 50, and these light sensitive elements may be disposed relative to the reading station so that the leading edge of the record card covers each light sensitive element in succession as the card columns are successively presented to the reading elements 40. According to the present invention, the number of light sensitive elements 50 is less than the number of columns in a record card, and is preferably a submultiple of the number of columns.

The logic arrangement of FIGURE 3 is for a system wherein the number of light sensitive elements 50 (FIGURE 2) is one-half the number of columns on the record card. In that case, the spacing between the centers of adjacent light sensitive elements 50 is twice the spacing between the center lines of adjacent columns on the record card 28. The light sensitive elements 50 may be disposed relative to the reading elements 40 so that the light sensitive elements 50 become covered in succession by the leading edge of the card as the first and every alternate column of the card thereafter are successively presented to the reading elements.

The light sensitive elements 50 are represented by the box 60 in FIGURE 3. The output of each light sensitive element is supplied to a separate amplifier 62, and the output of each amplifier may be supplied to a separate one-shot 64. The purpose of each one-shot is to produce a pulse of predetermined duration when the respective light sensitive element becomes covered by the leading edge of the document. All of the one-shots 64 have their outputs coupled to a gate 66 which may be, for example, an OR gate when the one-shot outputs are positive pulses. In any event, the gate 66 is one which produces an output pulse whenever any of the one-shots 64 is producing an output pulse. Gate 66 has its output applied as one input to a coincidence gate 68 which may be, for example, an AND gate when the gate 66 is an OR gate. A second input to the coincidence gate 68 is a CARD PRESENT (P) level which is derived from the light sensitive element 44 in the reading station (FIGURE 2) and is positive whenever a card is present in the reading station.

As mentioned hereinabove, the number of light sensitive elements is one-half the number of card columns. Accordingly, gates 66 and 68 produce output pulses which occur when the odd numbered columns of the record card are presented at the reading station. These pulses may be coupled or applied to one input of a gate 70, which may be an OR gate for pulses of the polarity discussed. Pulses corresponding to the presence of an even numbered column of the card at the read station are generated by means of a delay device 72 coupled between the output of the gate 68 and a second input of the gate 70. This device 72 delays the output of the gate 68 for a period of time equal to the time it takes for the record card to move a distance corresponding to the distance between center lines of adjacent columns of the card.

By way of example, let it be assumed that the distance between the center lines of adjacent card columns is X inch. Let it be further assumed that the rollers 30 move the record card at a normal speed of Y inches per second. Under these conditions, the delay device 72 is one which produces a delay of $X/Y$ seconds. Accordingly, gate 68 produces an output pulse each time an odd numbered card column is present at the read station, and delay device 72 produces an output pulse each time an even numbered column is present at the read station. By means of this arrangement, it is possible to greatly reduce the number of amplifiers 62 and one-shots 64 which would be required if a separate light sensitive element were supplied for each card column.

The output of gate 70 is supplied as one input to each of a series of gates 76, there being one such gate 76 for each reading element 40 (FIGURE 2) in the processing station. The outputs of the separate reading elements 40 are amplified by devices 78 and applied as second inputs to the series of gates 76. Gates 76 are coincidence gates, each of which produces an output signal upon the concurrence of an output from a different reading element and a "strobe" output pulse from the gate 70. These strobe pulses serve to clock the outputs of the reading elements to user equipment at predetermined times in the operating cycle.

Any information or data sensed by the reading elements during the absence of a strobe pulse does not pass through the gates 76 to the user equipment. Accordingly, if the record card has been perforated improperly so that one or more of the perforations misregister with data storage positions of the card, by more than a given amount, as determined by the width of the strobe pulses, the read circuitry will not detect the mispunched perforation and there will be a loss of data. According to another feature of the invention, the outputs of the reading elements are sampled during a portion of the nonstrobe period to detect improperly located perforations and to signal an error condition upon the detection of an improper perforation. This may be accomplished according to the invention by coupling the outputs of all of the read amplifiers 78 to a gate 82.

Gate 82, which may be an OR gate if the amplifier outputs are positive signals, is one which produces an output signal whenever any reading element is sampling data. The output of gate 82 is supplied to one input of a coincidence gate 84, and the output thereof is applied at the set (S) input terminal of a flip-flop 86. A second input to the coincidence gate 84 may be derived from the output of gate 70. As mentioned previously, gate 70 produces an output pulse each time a card column is present at the read station. The output of gate 70 may be delayed in a device 90 and coupled to a one-shot 92, the output of which is applied to the coincidence gate 84.

The delay provided by device 90 is such that an output pulse appears at the output thereof beginning at a time when a predetermined point in the space between adjacent card columns should be present at the reading station. The one-shot 92 produces a pulse of predetermined duration corresponding in time to the presence of a predetermined portion of the intercolumn space which is present at the reader. If any reading element is sensing data during the presence of an output from the one-shot 92, coincidence gate 84 passes a signal to set the flip-flop 86 and signal an error condition. Flip-flop 86 is reset by a signal designated "CARD PRESENT (N)," which signal is derived from the sensing element 44 (FIGURE 2) in the read station when no card is present. Thus, flip-flop 86 becomes reset after a document passes through the read station and before the next document arrives at the station.

Figure 4:
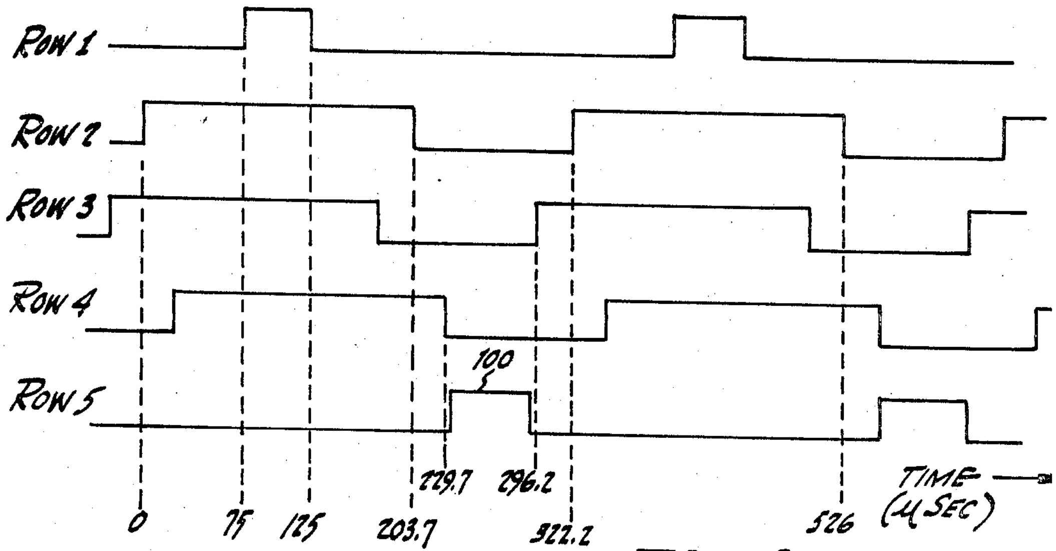
FIGURE 4 is a timing diagram for explaining the operation of the logic circuitry.

Operation of the system as described above may be more fully understood by a consideration of the waveforms in FIGURE 4. Consider, for example, that the record card is one having eighty columns and twelve rows. In such a card, the centers of adjacent columns are spaced a distance 0.087 inch from one another. Let it be assumed that the rollers 30 (FIGURE 2) feed the record cards at a normal speed of 270 inches per second. The time for moving a card a distance corresponding to the distance between the center lines of adjacent columns is then approximately 322.2$\mu$ seconds. The width of a punch or perforation is 0.055 inch, and the time to move the record card this distance is 203.7$\mu$ seconds. The so-called "land area," or area between punches in adjacent columns, has a dimension of 0.032 inch in the direction of card travel, corresponding to a travel time of 118.5$\mu$ seconds.

In FIGURE 4, time is measured arbitrarily from the leading edge of a data storage position in the first column of the card presented to the reading elements. Row 2 illustrates the condition for a properly perforated card, wherein the punch in the first column is present at the read station during the time 0 to 203.7$\mu$ seconds and the punch in the second column is present at the reading station from a time beginning at 322.2$\mu$ seconds and ending at 526$\mu$ seconds. The first light sensitive element 50 (FIGURE 2) is located so as to be covered by the leading edge of the document and to produce an output signal at a time 75$\mu$ seconds after the leading edge of the perforation in the first column is presented to the reading elements. The one-shots 64 (FIGURE 3) may produce pulses of 50$\mu$ second duration, whereby a strobe pulse 98 is applied to the set of read gates 76 when the central portion of the card column is present at the read station.

The error check circuit allows for a tolerance of 0.007 inch in the column perforations. If a perforation is off-center by less than this amount, the card is considered to be perforated properly. If the perforation is off-center by more than 0.007 inch, the card is considered to be improperly perforated and an error condition will be signaled. Row 3 illustrates the condition wherein the perforations are off-center by 0.007 inch in the direction of the leading edge of the card. Row 4 illustrates the condition wherein the perforations are off-center by 0.007 inch in a direction toward the trailing edge of the card. For the condition illustrated in row 3, it will be noted that the read element will produce an output which begins at a time prior to that for a properly perforated card. For the condition in row 4 the read element, in response to a sensed perforation, produces an output which begins and ends later than that corresponding to a properly punched perforation.

The delay device 90 (FIGURE 3) is selected to delay the output of gate 70 until the portion of the land area 0.007 inch past the data storage position is presented to the card reader. One-shot 92 produces a pulse which terminates when the portion of the land area 0.007 inch prior to the next card column is present at the reader. This pulse 100 is shown in row 5 of FIGURE 4. It will be noted that the pulse 100 is present during the period from 229.7$\mu$ seconds to 296.2$\mu$ seconds. This pulse begins shortly after the perforation in row 4 passes the read station, and the pulse 100 terminates shortly before the perforation in row 3 is presented to the read station. If the perforation is off-center by more than 0.007 inch, the perforation will still be present at the read station when the pulse 100 is applied at the gate 84 (FIGURE 3). In this case, both of the inputs to gate 84 will be energized, and the flip-flop 86 will become set to indicate an error condition.

Although the error check circuitry has been discussed in connection with detecting perforations which are off-center by more than a predetermined tolerance, it will be apparent to one skilled in the art that this error check circuit will also signal an error condition where the perforation are properly located, but where the card is fed to the reading station at an angle of skew which is greater than a predetermined amount.

Figure 5:
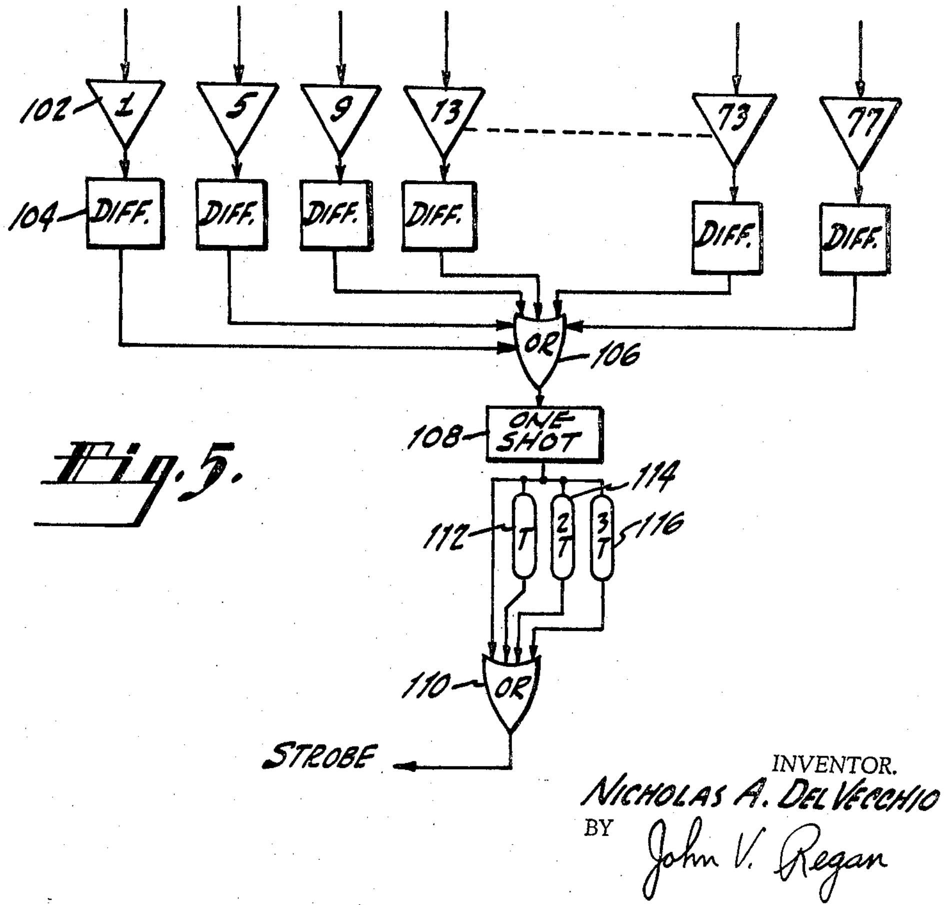
FIGURE 5 is a logic arrangement for another timing and synchronizing technique embodying the invention.

FIGURE 5 is an arrangement for generating timing and synchronizing pulses where the number of light sensitive elements 50 (FIGURE 2) is less than half the number of card columns. In particular, the arrangement illustrated is for use in a system wherein there is one light sensitive element 50 for every four columns of the record card. These light sensitive elements are disposed relative to the reading station so that the light sensitive elements become covered by the leading edge of the document and produce output signals successively as the first and every fourth column thereafter of the record card are presented to the reading station. The outputs of these light sensitive elements 50 are applied to separate amplifiers 102. As an alternative to the FIGURE 3 arrangement, the output of each amplifier 102 is differentiated by a circuit 104, and the outputs of all of the differentiators are supplied to a gate 106.

Gate 106 produces an output each time any light sensitive element becomes covered by the leading edge of a document. Although it is not shown in the drawing, each differentiator may include means for clipping output signals of one polarity from the differentiator. The output of gate 106 is supplied to a one-shot 108 which produces pulses of desired duration as shown, for example, in row 1 of FIGURE 4. The one-shot 108 output is coupled to one input of a second gate 110 and is also coupled to the input of delay devices 112, 114 and 116. The outputs of the delay devices 112–116 are individually applied at separate inputs of the gate 110.

One-shot 108 produces an output pulse when the first and every fourth column thereafter of the record card are presented at the reading station. Delay device 112 delays this output for a time equal to the time it takes to move the record card a distance corresponding to the spacing between center lines of adjacent columns. When this distance X inches and the card is moving at a rate of Y inches per second, first delay device 112 produces a delay of $X/Y$ seconds. The other delay devices 114 and 116 produce delays which are successive multiples of $X/Y$ seconds. In particular, delay device 114 produces a delay of $2X/Y$ seconds and device 116 produces a delay of $3X/Y$ seconds. Accordingly, a pulse is present at the output of gate 110 as each column of the card is present at the reading station.

The function of the delay devices 112–116 is to reduce the number of required light sensitive elements and associated amplifiers and other circuitry which add materially to the cost of the system. However, the number of delay devices which may be employed is necessarily limited and dependent upon reasonably stable operation of the feed rollers. As is known, some slippage is often encountered with feed rollers. The slippage usually is of such a nature that a few light sensitive elements may be eliminated and replaced by delay devices without introducing faulty timing operation.

What is claimed is:

1. In a reader system for documents having N lines of data storage positions at fixed locations thereon, adjacent lines of storage positions being separated by an interspace, the combination comprising:

first means for feeding said documents along a feed path in a direction normal to the document lines;

a series of reading elements disposed across said path for reading said documents a line at a time and for producing output signals in response to sensed data;

second means synchronized with the movement of a document along said path for generating a single series of timing pulses each pulse, in said series, occurring during a portion of the time allotted for a different said interspace to pass said reading elements; and third means for producing a signal indication unconditionally upon the concurrence in time of a said timing pulse from said second means and an output signal from any reading element.

2. In a reader system for documents having N lines of data storage positions at fixed locations thereon, adjacent lines of storage positions being separated by an interspace, the combination comprising:

first means for feeding said documents along a feed path in a direction normal to the document lines;

a series of reading elements disposed across said path for reading said documents a line at a time and for producing output signals in response to sensed data;

second means synchronized with the movement of a document along said path for generating a single series of timing pulses each pulse, in said series, occuring during a portion of the time allotted for a different said interspace to pass said reading elements;

a third means for producing a signal indication unconditionally upon the concurrence in time of a said timing pulse from said second means and an output signal from any reading element; and a bistable element having an input terminal coupled to the output of said third means.

3. In a reader system for perforated record cards having N lines of data storage positions at fixed locations thereon, adjacent lines being separated by a land area, the combination comprising:

means for feeding said cards along a given path in a dirtction normal to the data lines;

a series of reading elements disposed across said path for reading said cards a line of time and for producing output signals in response to sensed perforations;

means synchronized with the movement of a card along said path for producing a single series of timing pulses each pulse, in said series, occurring during a portion of the time alloted for a different land area to pass said reading elements; and means for signaling an error condition, indicating a perforation in a land area portion, upon the concurrence in time of a timing pulse from said timing pulse producing means and a signal output from any of said reading elements.

4. In a processing system for documents each having at least N lines of data storage positions, where N is an even integer greater than two, the centers of adjacent lines being separated from each other by a distance of X inch, the combination comprising:

means for feeding said documents along a given path at a normal rate of Y inches per second in a direction normal to the document lines;

a series of work elements disposed across said feed path;

a single series of $N/2$ light sensitive elements along said feed path, the centers of adjacent light sensitive elements being spaced from each other a distance 2X in the direction of document feed;

first means having an output, said first means being coupled to the outputs of said light sensitive elements for generating a separate signal at the output of said first means in response to the covering of each different light sensitive element by a document;

gate means having a first input coupled to the output of said first means; and delay means coupling said output of said first means to a second input of said gate means and providing a delay of $X/Y$ seconds.

5. In a processing system for documents each having at least N lines of data storage positions, where N is an even integer greater than two, the centers of adjacent lines being separated from each other by a distance of X inch, the combination comprising:

means for feeding said documents along a given path at a normal rate of Y inches per second in a direction normal to the document lines;

a series of work elements disposed across said feed path;

a single series of $N/2$ light sensitive elements along said feed path spaced to be successively covered by a document as successive odd numbered lines thereon are presented to said work elements;

first means coupled to the outputs of said light sensitive elements for generating a separate signal in response to the covering of each different light sensitive element by a document;

delay means coupled to receive the output of said first means and having a delay of $X/Y$ seconds, whereby said delay means produces an output when an even numbered line on a document is presented to said work elements; and gate means connected to receive the outputs of said first means and said delay means.

6. In a processing system for documents each having at least N lines of data storage positions, where N is an even integer greater than two, adjacent lines being separated by an interspace and the centers of adjacent lines being spaced a distance X inch, the combination comprising:

means for feeding said documents along a given path at a normal rate of Y inches per second in a direction normal to the document lines;

a series of work elements disposed across said feed path;

a single series of $N/2$ light sensitive elements along said path spaced to be successively covered by a document as successive odd numbered lines thereon are presented to said work elements;

first means coupled to the outputs of said light sensitive elements for generating a separate signal in response to the covering of each different light sensitive element;

delay means coupled to the output of said first means and having a delay of $X/Y$ seconds for producing an output when an even numbered document line is presented to said work elements;

gate means coupled to receive the outputs of said first means and said delay means; and delay means coupled to receive the output of said gate means for producing a signal when a document interspace is presented to said work elements.

7. In a reading system for documents each having at least N lines of data storage positions, where N is an even integer greater than two, the centers of adjacent lines being separated from each other by a distance of X inch, the combination comprising:

means for feeding said documents along a given path at a normal rate of Y inches per second in a direction normal to the document lines;

a series of reading devices disposed across said feed path for reading data a line at a time;

a single series of $N/2$ light sensitive elements along said feed path spaced to be successively covered by a document as alternate lines thereon are presented to said reading devices;

first means coupled to the outputs of said light sensitive elements for generating a separate signal in response to the covering of each different element by a document;

gate means having a first input coupled to the output of said first means;

delay means coupling said output of said first means to a second input of said gate means and providing a delay of $X/Y$ seconds;

a series of gates each having one input coupled to receive the output of a different reading device; and means for coupling the output of said gate means to a second input of each of said series of gates.

8. In a processor for documents each having at least N lines of data storage positions, where N is an even integer greater than two, the centers of adjacent lines being separated from each other by a distance of X inch, the combination comprising:

means for feeding said documents along a given path at a normal rate of Y inches per second in a direction normal to the document lines;

a series of work elements disposed across said feed path;

a single series of $N/2$ light sensitive elements along said feed path, the centers of adjacent light sensitive elements being spaced from each other a distance 2X in the direction of document feed;

first means coupled to the outputs of said light sensitive elements for generating a separate signal as each different odd numbered document line is presented to said work elements;

delay means coupled to receive the output of said first means and providing a delay of $X/Y$ seconds;

gate means coupled to receive the outputs of said first means and said delay means;

a series of gates each coupled to a different work element; and means for coupling the output of said gate means to an input of each of said series of gates.

9. In a reading system for documents each having at least N lines of data storage positions, where N is an even integer greater than two, the centers of adjacent lines being spaced a distance of X inch and adjacent lines being separated by an interspace, the combination comprising:

means for feeding said documents along a given path at a normal rate of Y inches per second in a direction perpendicular to the document lines;

a series of reading devices disposed across said path for sensing recorded data a line at a time;

a single series of $N/2$ light sensitive elements along said feed path spaced to be successively covered by a document as successive odd numbered lines thereon are presented to said reading devices;

first means coupled to said light sensitive elements for generating a separate signal in response to the covering of each different element by a document;

first delay means coupled to the output of said first means and having a delay of $X/Y$ seconds, whereby said delay means produces an output signal each time an even numbered line on a document is presented to said reading devices;

gate means connected to receive the outputs of said first means and said first delay means;

a series of coincidence gates each having a first input coupled to receive the output of a different reading device;

means coupling the output of said gate means to a second input of each of said series of gates;

second delay means connected at the output of said gate means for producing a timing pulse each time a selected portion of a document interspace is presented to said reading devices; and means for signaling an error condition, indicating data stored in an interspace portion, upon the concurrence of a said timing pulse and an output from any reading device.

10. In a processing system for documents each having at least N lines of data storage positions, where N is an even integer greater than two, the centers of adjacent lines being spaced from each other a distance of X inch, the combination comprising:

means for feeding said documents along a given path at a normal rate of Y inches per second in a direction normal to the document lines;

a series of work elements disposed across said path;

a single series of light responsive elements spaced along said feed path at increments of BX inches and disposed relative to said work elements to be successively covered by a document as the first line and every $B^{th}$ line thereafter of a document is presented to said work elements, where B is an integer greater than one;

first means coupled to the outputs of said light responsive elements for generating a separate signal in response to the covering of each different light sensitive element by a document;

$(B-1)$ delay means each coupled to receive the output of said first means, a first one of said delay means providing a delay of $X/Y$ seconds and the other delay means providing delays which are successive multiples of $X/Y$ seconds; and gate means coupled to receive the outputs of said first means and all of said delay means.

11. In a reading system for documents each having at least N lines of data storage positions, where N is an even integer greater than two, the centers of adjacent lines being spaced from each other a distance of X inches, the combination comprising:

means for feeding said documents along a given path at a normal rate of Y inches per second in a direction normal to the document lines;

a series of reading devices disposed across said path for reading data a line at a time;

a single series of light responsive elements spaced along said feed path at increments of BX inches and disposed relative to said reading devices to be successively covered by a document as the first line and every $B^{th}$ line thereafter of a document is presented to said reading devices, where B is an integer greater than one;

first means coupled to the outputs of said light responsive elements for generating a separate signal in response to the covering of each different element by a document;

$(B-1)$ delay means each coupled to the output of said first means, a first one of said delay means providing a delay of $X/Y$ seconds and the other delay means providing delays which are successive multiples of $X/Y$ seconds;

gate means coupled to receive the outputs of said first means and all of said delay means;

a series of gates each having one input coupled to receive the output of a different reading device; and means for coupling the output of said gate means to a second input of each of said series of gates.

12. In a reading system for documents each having at least N lines of data storage positions, where N is an even integer greater than two, the centers of adjacent lines being spaced from each other a distance of X inches, and adjacent lines being separated by an interspace, the combination comprising:

means for feeding said documents along a given path at a normal rate of Y inches per second in a direction normal to the document lines;

a series of reading devices disposed across said path for reading data a line at a time;

a single series of light responsive elements spaced along said feed path at increments of BX inches and disposed relative to said reading devices to be successively covered by a document as the first line and every $B^{th}$ line thereafter of a document is presented to said reading devices, where B is an integer greater than one;

first means coupled to the outputs of said light responsive elements for generating a separate signal in response to the covering of each different element by a document;

$(B-1)$ delay means each coupled to receive the output of said first means, a first one of said delay means providing a delay of $X/Y$ seconds and the other delay means providing delays which are successive multiples of $X/Y$ seconds;

gate means coupled to the outputs of said first means and all of said delay means;

a series of gates each having one input coupled to receive the output of a different reading device;

means for coupling the output of said gate means to a second input of each of said series of gates;

delay means connected at the output of said gate means to produce a timing pulse as a selected portion of each document interspace is presented to said reading devices; and means signaling an error condition, indicating data stored in an interspace portion, upon the sensing of data by any reading device during the presence of a said timing pulse.

References Cited

UNITED STATES PATENTS

| | | | |
|---|---|---|---|
| 3,284,929 | 11/1966 | Azure. | |
| 2,831,634 | 4/1958 | Luhn. | |
| 3,142,749 | 7/1964 | Larsen. | |
| 3,173,000 | 3/1965 | Johnson et al. | 250—219 X |
| 3,198,331 | 8/1965 | Larsen et al. | 235—61.11 |

MAYNARD R. WILBUR, Primary Examiner

THOMAS J. SLOYAN, Assistant Examiner

U.S. Cl. X.R.

250—219